Aug. 30, 1955
D. R. LUNGER
2,716,329
JET ENGINE
Filed Aug. 1, 1952
2 Sheets-Sheet 1
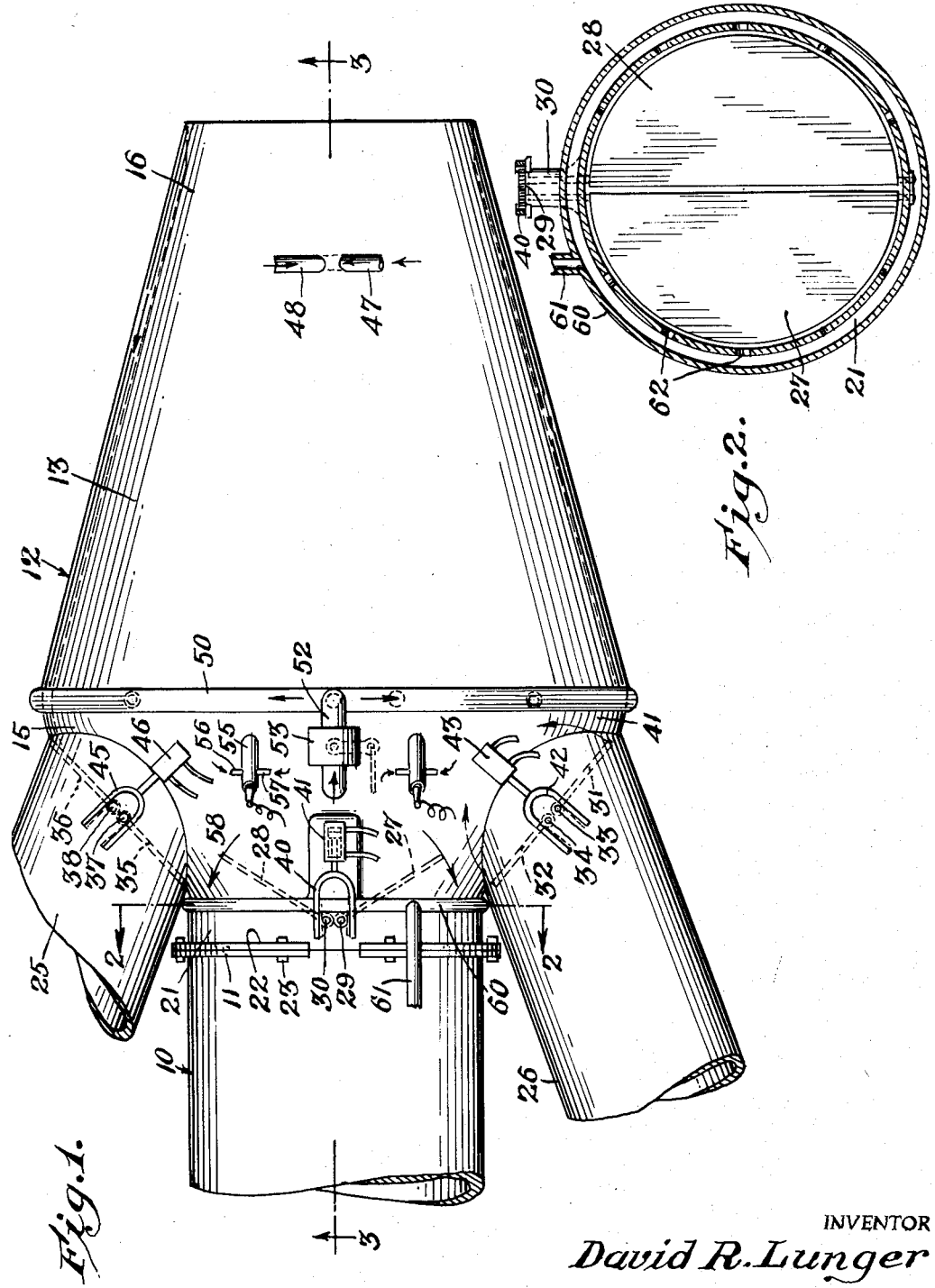
INVENTOR
David R. Lunger
BY
McMorrow, Berman + Davidson
ATTORNEYS.

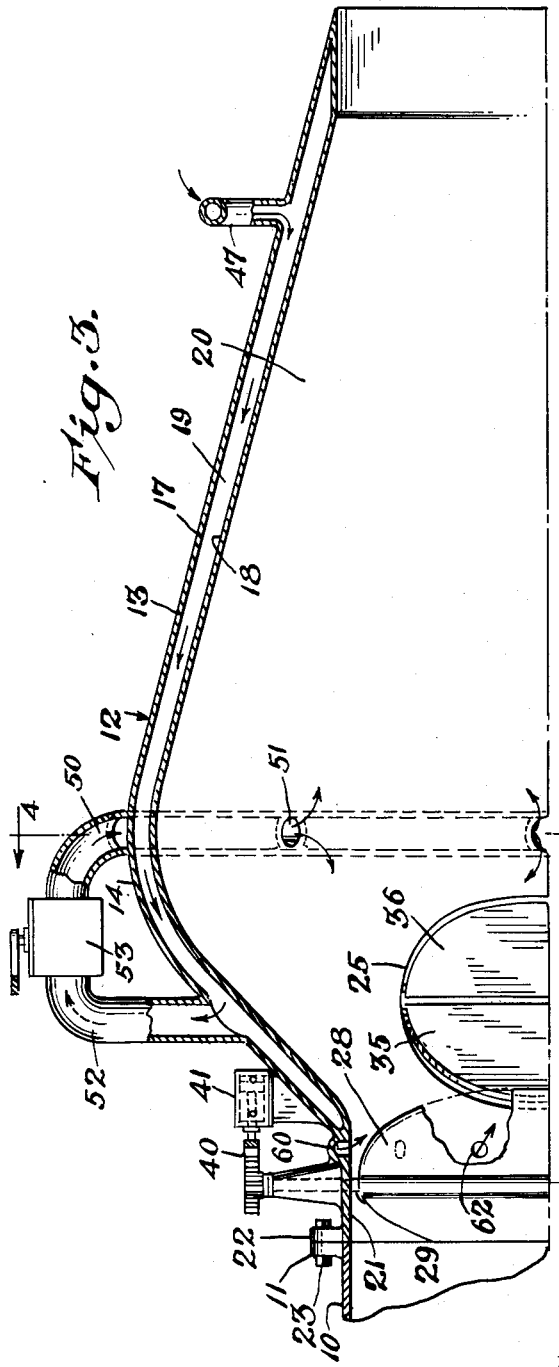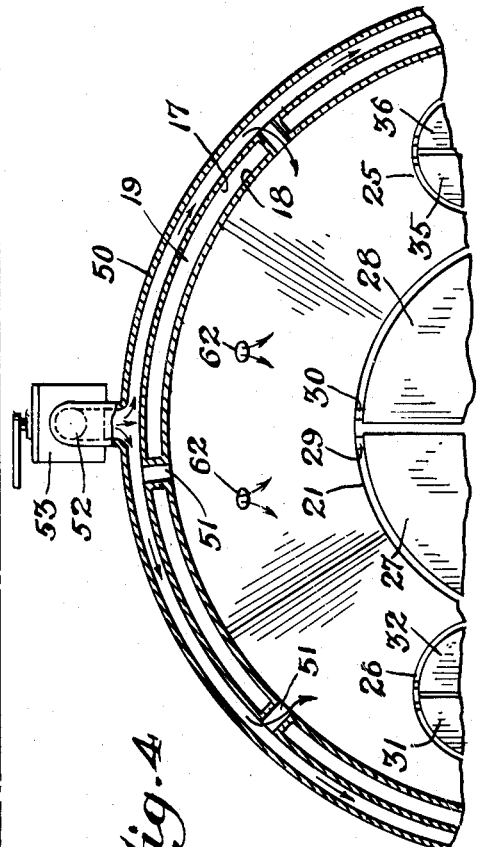

United States Patent Office 2,716,329
Patented Aug. 30, 1955

2,716,329

JET ENGINE

David R. Lunger, Westfield, Pa.

Application August 1, 1952, Serial No. 302,115

3 Claims. (Cl. 60—35.6)

This invention relates to jet engines and more particularly to an after or auxiliary rear section for a turbojet engine to add to the turbojet operation after burning assistance, and independent athodyd jet and rocket operation.

It is among the objects of the invention to provide an auxiliary rear section which can be coupled to the rear end of an existing turbojet engine or incorporated as an additional part of a new turbojet engine to give additional methods of operation to a turbojet aircraft engine for improving the fuel efficiency of the engine and increasing the speed range and acceleration characteristics of an associated aircraft; which will provide for operation of the engine as a straight turbojet engine, an after burning assisted turbojet, a straight athodyd jet engine or a straight rocket engine; which utilizes jet fuel or rocket fuel, depending upon the current method of operation, and includes means for preheating the fuel before admitting to the combustion chamber of the auxiliary rear section; which includes valve doors for changing the source of intake air between the air compressor of the turbojet engine and the ram scoops or ducts for the athodyd jet operation; which does not materially increase the weight of the turbojet engine on which it is installed, nor interfere with the normal operation of the associated turbojet engine; and which is simple and durable in construction and effective and efficient in operation.

Other objects and advantages will become apparent from a consideration of the following description and the appended claims in conjunction with the accompanying drawings wherein:

Figure 1 is a top plan view of an auxiliary rear section illustrative of the invention shown coupled to the rear end of a turbojet engine fragmentarily illustrated;

Figure 2 is a transverse cross sectional view on the line 2—2 of Figure 1;

Figure 3 is a longitudinal cross sectional view of the upper half of the auxiliary rear section taken on the line 3—3 of Figure 1; and Figure 4 is a transverse cross sectional view on the line 4—4 of Figure 3.

With continued reference to the drawings, the numeral 10 indicates the rear end portion of the discharge duct of a turbojet engine which may be a turbojet engine of well known construction. At its rear end this discharge duct is provided with an outwardly extending annular coupling flange 11 by means of which the auxiliary rear section, generally indicated at 12, can be coupled at its front end to the rear end of the associated turbojet engine.

The auxiliary rear section 12 comprises a body 13, preferably of circular cross sectional shape, having front and rear open ends of substantially the same diameter as the rear end opening of the discharge duct or nozzle 10 of the associated turbojet engine, and having intermediate its length a portion 14 of maximum diameter disposed nearer the front end than the rear end of the body. The body tapers in both directions from the portion 14 of maximum diameter and includes a front portion 15 of truncated conical shape and a rear portion 16 also of truncated conical shape extending from the portion or zone 14 of maximum diameter to the rear open end of the body. The body 13 is a double walled structure having inner and outer sheet metal walls 17 and 18 uniformly spaced apart between the ends of the body and joined together at the ends of the body to enclose therebetween an annular cooling chamber 19 and within the inner wall a combustion chamber 20. At its front end the body is provided with a forwardly extending and coaxially disposed cylindrical sleeve 21, the front end of which is provided with an outwardly projecting annular flange 22 which abuts the flange 11 on the rear end of the discharge duct 10 of the jet engine, and the flanges 11 and 12 are secured together by suitable means, such as the bolts 23 extending through registering apertures in the two flanges.

With this arrangement, the discharge of exhaust gases from the turbojet engine through the discharge duct or nozzle 10 flows through the combustion chamber 20 of the auxiliary rear section 12 and out of the rear end of the auxiliary rear section without any material interference.

Ram ducts 25 and 26 lead through both walls 17 and 18 of the body 13 between the portion 14 of maximum diameter and the rear end of the sleeve portion 22 into the combustion chamber 20 and are disposed at substantially diametrically opposite sides of the sleeve extension 21. These ducts are connected at their front ends to air intake openings or scoops, and may constitute portions of air intake scoop structures.

A pair of doors 27 and 28 of substantially semi-circular shape are mounted in the sleeve extension 21 at the rear end of the latter on shafts 29 and 30 respectively, which extend substantially diametrically of the sleeve section, and these doors are effective to close off the passage from the rear of the associated jet engine into the front end of the combustion chamber 20 of the auxiliary rear section 12. Doors 31 and 32 are mounted in the ram duct 26 at the end of this duct entering the combustion chamber 20 on shafts 33 and 34 respectively, which extend substantially diametrically of the associated ram duct, and similar doors 35 and 36 are mounted in the ram duct 25 at the end of the latter adjacent the combustion chamber 20 on shafts 37 and 38 respectively, which extend substantially diametrically of the associated ram duct.

Gears are mounted one on each of the shafts 29 and 30 at the outer side of the sleeve extension 21 and a U-shaped rack 40 has rack teeth on the inner sides of its legs meshing respectively with these gears. This rack is connected to a double acting hydraulic mechanism 41 which can be manually controlled to move the rack 40 to open or close the doors 27 and 28.

Gears are also mounted on the shafts 33 and 34 at the outer side of the ram duct 26 and a U-shaped rack 42 has teeth on the inner sides of its legs meshing with these gears. The rack 42 is connected to a double acting, manually controlled hydraulic mechanism 43 which moves the rack 42 to open and close the doors 31 and 32 and the shafts 37 and 38 are provided outside of the ram duct 25 with gears which mesh with the teeth on the inner sides of the legs of a U-shaped rack 45 connected to a double acting, manually controlled hydraulic mechanism 46 which moves the rack 45 to open and close the doors 35 and 36.

The hydraulic devices 43 and 46 have a common control valve, so that the doors 31 and 32 are opened or closed simultaneously with the doors 35 and 36, while the hydraulic device 41 has a separate control valve so that the doors 27 and 28 at the rear end of the engine discharge duct 10 can be opened or closed independently of the doors in the ram ducts.

Fuel conduits 47 and 48 lead through the outer wall 17 of the body 13 and into the annular cooling chamber 19 near the rear end of the cooling chamber, one of these conduits conducting jet fuel, and the other conducting rocket fuel to the cooling chamber. The conduits are provided with manually controlled valves, not illustrated, so that either jet fuel or rocket fuel can be selectively supplied to the cooling chamber 19. A hollow charge distributing ring 50 surrounds the body 13 at the zone 14 of maximum diameter and this hollow ring communicates interiorly with the interior of the body 13 through angularly spaced apart ports 51 which extend through both walls 17 and 18 of the body and through the cooling chamber 19 into the combustion chamber 20 for conducting fuel from the interior of the ring past the cooling chamber and into the combustion chamber.

A U-shaped duct 52 has one end extending through the outer body wall 17 and into the cooling chamber 19 at a location within the forward portion 15 of the body and its other end extending into the charge distributing ring 50 to connect the cooling chamber near the front end of the latter to the interior of the charge distributing ring. A manually controlled throttle valve 53 is interposed in the conduit 52 for regulating the supply of fuel to the combustion chamber of the auxiliary rear section.

With the arrangement so far described, and with the doors 27 and 28 open and the doors 31 and 32 and 35 and 36 closed, and with the jet engine in operation, the device may be operated as a straight turbojet engine with the exhaust blast from the jet engine passing directly through the auxiliary rear section 12 and out of the rear discharge end of the latter. If, after burning assistance to the turbojet operation is desired, jet fuel is supplied to the combustion chamber 19 through the appropriate fuel conduit 47 or 48 and the valve 53 is opened to supply this auxiliary fuel to the exhaust jet from the turbojet engine and add the energy of this supplementary fuel to the exhaust blast.

A plurality of small rocket devices 55 extend through the outer and inner walls 17 and 18 of the body 12 at substantially equal angular intervals around the body and at a location spaced forwardly of the zone 14 of maximum diameter of the body. These rocket devices are supplied with liquid oxygen and rocket fuel through suitable conduits 56 and 57 and each rocket device is provided with an ignition means, such as the spark plugs 58. These rocket devices function as ignition means when the auxiliary rear section is operating as an athodyd jet engine or a straight rocket engine.

When the speed of the associated aircraft has been brought up to a maximum with the turbojet engine or after burning assisted turbojet, operation of the turbojet engine is discontinued, the doors 27, 28, 31, 32, 35 and 36 are all closed and rocket operation is utilized by supplying rocket fuel to the fuel distributing ring 50 and the rocket devices 55.

The rocket power is used to bring the speed of the associated aircraft up to a value of approximately one thousand miles per hour above which speed the athodyd jet will operate efficiently.

After a sufficient speed has been obtained, the supply of rocket fuel to the ring 50 is discontinued and jet fuel is again supplied to the ring, the supply of rocket fuel and oxygen to the rocket devices 55 being continued. The valve doors 31, 32, 35 and 36 are opened to provide a ram blast of intake air into the front end of the combustion chamber 20 and a discharge blast is directed through the rear open end of the auxiliary rear section 12 to provide the athodyd jet operation of the device.

A liquid oxygen distributing ring 60 surrounds the sleeve extension 21 near the rear end of this extension and is connected by a conduit 61 with a suitable source of liquid oxygen, a suitable valve, not illustrated, being connected into the conduit 61 to control the supply of oxygen to the charge distributing ring 60. The ring 60 communicates with the interior of the body 13 through ports 62 which extend through the sleeve extension 21 at the rear sides of the doors 27 and 28 when these doors are closed, and into the front end of the combustion chamber 20.

If the speed of the associated aircraft has been brought up to where rocket power can be efficiently used, and it is desired to use such power, the doors 27, 28, 31, 32, 35 and 36 are all closed, so that no atmospheric air enters the combustion chamber 20. The supply of liquid oxygen is turned on to the oxygen charge distributing ring 50 and rocket fuel is supplied to the cooling chamber 19 through the appropriate conduit 47 or 48 and, with the valve 53 open, this rocket fuel is fed from the charge distributing ring 50 into the combustion chamber 20 at the location of maximum diameter of the combustion chamber.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. An auxiliary rear section for a turbojet engine comprising a double walled annular body having open front and rear ends and a portion of maximum diameter intermediate its length and nearer its front than its rear end, said body being tapered from said portion of maximum diameter to both its ends and the inner and outer walls of said body being uniformly spaced apart between the ends and joined together at the ends of said body to provide a combustion chamber within said body and an annular cooling chamber surrounding said combustion chamber, annular coupling means on the front end of said body adapted to connect said body at its front end to the rear end of an associated turbojet engine, a first hollow charge distributing ring surrouning said body at the front end of the latter and communicating through angularly spaced apart ports with the interior of said body to supply liquid oxygen to the front end of said combustion chamber for rocket operation, a second hollow charge distributing ring surrounding said body at the location of maximum diameter of the latter and communicating through angularly spaced apart ports with the interior of said body to supply jet and rocket fuel to said combustion chamber, jet and rocket fuel conduits leading through the outer wall of said body into said cooling chamber near the rear end of the latter, a conduit leading from said cooling chamber near the front end of the latter through said outer wall and into said second charge distributing ring, a fuel regulating valve in the last mentioned conduit, ram ducts leading through both walls of said body between the front end of the latter and said location of maximum diameter and into the front end of said combustion chamber, a set of valve doors in the front end of said body, sets of valve doors disposed one in each of said ram ducts at the ends of the latter entering said combustion chamber, power operated means connected to said valve doors and manually controllable to open the doors in the front end of said body and close the doors in said ram ducts for turbojet operation of said engine, close the doors in the front end of said body and open the doors in said ram ducts for athodyd jet operation and close all of said doors for rocket operation, said second charge distributing ring being effective to supply jet fuel to said combustion chamber for after burning assistance to turbojet operation, rocket ignition devices extending through both walls of said body at angular intervals between the front end of the body and said location of maximum diameter, and conduit means connected to said rocket devices for supplying liquid oxygen and rocket fuel thereto, said second charge distributing ring being effective to supply jet engine fuel to said combustion chamber for athodyd jet operation and said first and second charge distributing rings being effective to supply liquid oxygen and rocket fuel respectively to said combustion chamber for rocket operation.

2. In combination with a turbojet engine having a rear discharge duct, an auxiliary rear section comprising an annular body having an open front end disposed at the rear end of said engine discharge duct and an open rear end spaced rearwardly from said front end, means coupling said body at its front end to the rear end of said engine discharge duct, said body having an outer wall and an inner wall spaced from said outer wall and providing a combustion chamber within said inner wall and an annular cooling chamber surrounding said combustion chamber between said inner and outer walls, conduit means connected to said cooling chamber for supplying jet engine and rocket fuel to the latter, conduit means connecting said cooling chamber to said combustion chamber for conducting fuel from said cooling chamber into said combustion chamber, ram ducts extending through said body walls and communicating with said combustion chamber near the front end of the latter and at respectively opposite sides of said front opening, valve doors in said front opening and in said ram ducts for opening and closing said opening and said ducts, means connected to the doors in said front opening for moving these doors between their opened and closed positions, means connected to the doors in the ram ducts for simultaneously moving these doors between their opened and closed positions, conduit means in communication with said combustion chamber near the front end of the latter for supplying liquid oxygen thereto, and rocket devices extending through the walls of said body and into said combustion chamber intermediate the length of the latter, said body having a zone of maximum diameter intermediate its length and tapering from said zone of maximum diameter to both its ends.

3. In combination with a turbojet engine having a rear discharge duct, an auxiliary rear section comprising an annular body having an open front end disposed at the rear end of said engine discharge duct and an open rear end spaced rearwardly from said front end, means coupling said body at its front end to the rear end of said engine discharge duct, said body having an outer wall and an inner wall spaced from said outer wall and providing a combustion chamber within said inner wall and an annular cooling chamber surrounding said combustion chamber between said inner and outer walls, conduit means connected to said cooling chamber for supplying jet engine and rocket fuel to the latter, conduit means connecting said cooling chamber to said combustion chamber for conducting fuel from said cooling chamber into said combustion chamber, ram ducts extending through said body walls and communicating with said combustion chamber near the front end of the latter and at respectively opposite sides of said front opening, valve doors in said front opening and said ram ducts for opening and closing said opening and said ducts, means connected to the doors in said front opening for moving these doors between their opened and closed positions, means connected to the doors in the ram ducts for simultaneously moving these doors between their opened and closed positions, conduit means in communication with said combustion chamber near the front end of the latter for supplying liquid oxygen thereto, and rocket ignition devices extending through the walls of said body and into said combustion chamber intermediate the length of the latter.

References Cited in the file of this patent

UNITED STATES PATENTS

| | | |
|---|---|---|
| 2,479,776 | Price | Apr. 23, 1949 |
| 2,592,938 | McNaught | Apr. 15, 1952 |
| 2,635,420 | Jonker | Apr. 21, 1953 |